Nov. 28, 1933.  M. J. KAPLAN  1,937,086
FUEL TANK FOR AIRCRAFT
Filed Feb. 16, 1931  2 Sheets-Sheet 2

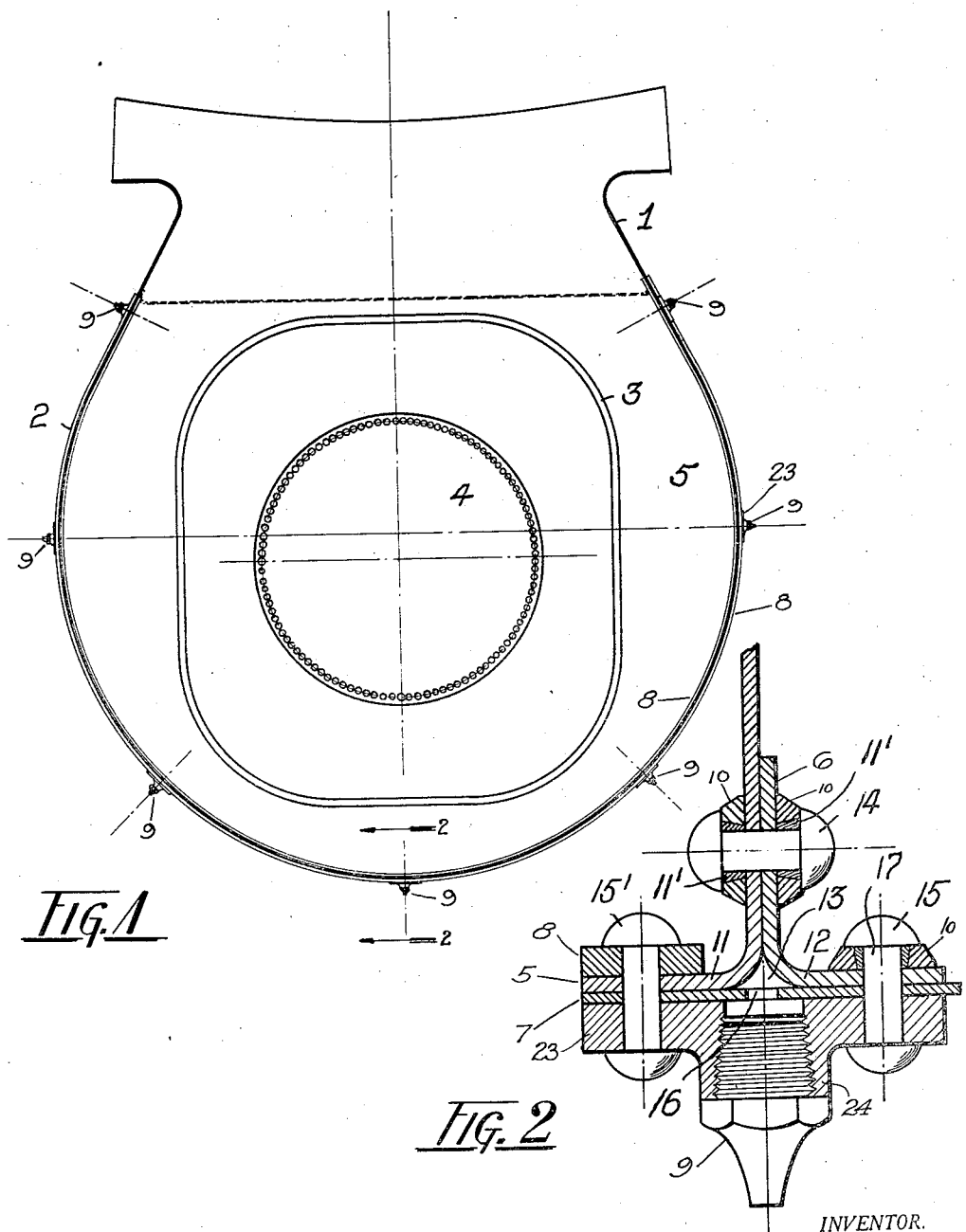

INVENTOR.
Michael J. Kaplan.
BY Herbert H. Thompson
ATTORNEY.

Patented Nov. 28, 1933

1,937,086

UNITED STATES PATENT OFFICE 1,937,086

FUEL TANK FOR AIRCRAFT

Michael J. Kaplan, Baltimore, Md., assignor to B/J Aircraft Corporation, Baltimore, Md., a corporation of Maryland Application February 16, 1931. Serial No. 515,920

6 Claims. (Cl. 220—75)

This invention relates to the construction of riveted metal fuel and oil tanks used on airplanes. Such tanks are usually formed of an alloy of aluminum and are sometimes built into and form an integral part of the fuselage structure. The main object of the invention is to make the riveted joints of such gasoline tanks gasoline tight and entirely free from leakage.

A further object is to provide means whereby such joints may be rendered gas tight after the tank is in service so that if a leak starts it may be stopped by the simple operation of pumping a suitable compound into the joint by a pressure gun, such as a grease gun used on automobiles.

My invention has a further advantage that the tank may be entirely assembled and then anodized as a unit and then rendered gas tight after the tank is thus completed.

With these and other purposes in view, I illustrate in the accompanying drawings such instances of adaptation as will disclose the broad underlying features of the invention without limiting myself to the specific details shown.

Fig. 1 shows a transverse section through a gasoline tank as installed in the fuselage of an airplane.

Fig. 2 is a sectional detail of my preferred form of riveted joint, the section being taken on line 2—2 of Fig. 1.

Figure 3:
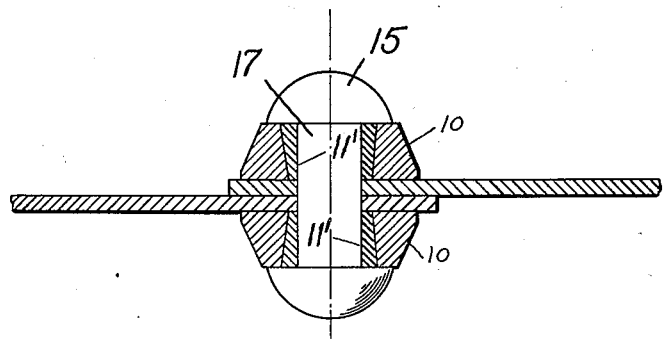
Fig. 3 is a section of my preferred form of riveted joint for overlapping seams.

The fuselage structure is shown at 1 and within this structure is placed a gasoline tank 2 which may be built up of several sections. One end thereof is shown in Fig. 1 having the strengthening rib 3 and the central plate 4 which is riveted to the main shell. Each end plate 5 is preferably riveted to the skin or shell 7 of the fuselage by the special joint shown in Fig. 2. The end plate is shown as provided with an out-turned flange 11. An in-turned flange is also provided by riveting an inner plate 6 to the plate 5 with the foot 12 thereof riveted directly to the skin 7. In order to stiffen the riveted joints I may apply a stiffening sheet metal band or strip 8 under the rivets 15' which holds the flange 5 of the end plate structure. There is thus formed between the skin 7 and the junction of the end 5 and the bar 6 a small triangular shaped space 13. If any gasoline leaked past either row of rivets 14 or 15 it would seep into this space. The shell 7 in this instance forms a covering plate for the space 13 left between the abutting elbows of the two flanges 11 and 12.

I accordingly provide a means for preventing leaks at this joint by providing means for filling the space completely with a gas tight semi-fluid compound such as Sealtite. For this purpose I bore at regular intervals holes 16 in the shell and I rivet at such places, preferably by means of the rivets 15—15', a small plate 23 having a threaded central boss 24 to receive a pressure nipple 9 by means of which the gas-tight compound may be forced into opening 13 under pressure. For this purpose a portable pressure pump or gun may be used, such as is used for forcing grease into the automobile shackle bolts. By providing such fittings, not only may this compound be forced into this space when the tank is completed but if any leaks develop in service they may be readily stopped by forcing more of the compound in through the fittings.

To further insure against leaks, it should be noted that I prefer to employ a special form of washer 10 under the heads of the rivets. This washer has a larger bore than the shank 17 of the rivet and is preferably also tapered. Between the washer and the rivet I place a reversely tapered nipple 11' preferably made of soft metal, such as pure aluminum or copper or lead. This nipple is also preferably slightly thicker than the washer 10. When, therefore, the rivet is driven and the head formed, the nipple being made of soft metal, compresses under the head of the rivet and inside the tapered hole of the washer filling up every available space between the rivet and the plate so that a gasoline tight seam is secured. By such construction, even if the hole is drilled slightly too large in the plates, the nipple when compressed will fill this space between the rivet and the plate.

By my construction it is not necessary to anodize separate parts of the tank before assembly, but the tank may be completely constructed, then anodized as a unit, and then placed in the shell of the airplane and rendered gas tight as a final process.

Figures 4, 5:
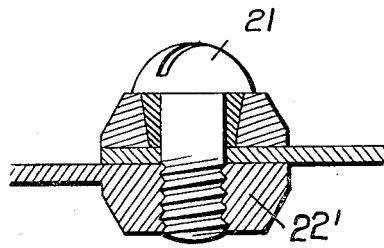
Fig. 4 is a sectional detail of the special washer employed.
Fig. 5 is a section showing my washer as used with a machine screw fastening.
Figure 6:
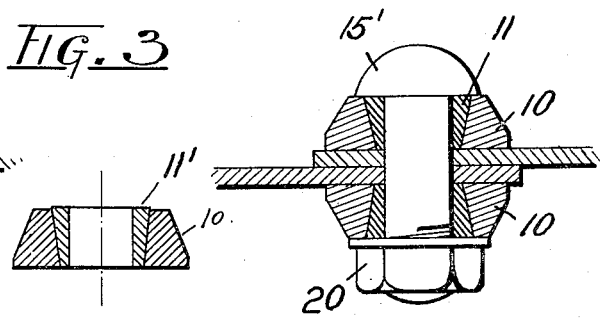
Fig. 6 is a corresponding view showing the same used with a bolt.

Thus my invention may employ other types of fastening means than rivets, such as machine screws or bolts. Fig. 6 shows how a bolt 15' and nut 20 may be used to fasten a lap joint in connection with my improved tapered nipples 11 and washers 10, and Fig. 5 shows how my tapered nipple and washer may be employed in connection with a machine screw fastening, the lower plate having a threaded boss 22' thereon into which the machine screw is threaded. These two forms of the invention are especially adapted for emergency repair work. The machine screw form of the invention is also especially suitable for securing in place on gas tanks, fittings that are highly stressed where rivets are apt to work loose.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A fuel tank for airplanes having inner and outer flanges on the end walls thereof abutting the shell of the fuselage, fastening means for securing said flanges to said shell at the joint of the airplane, said shell having spaced apertures therein along said joint, and pressure gun nipples secured to said shell adjacent said apertures whereby liquid tight compounds may be forced into the joint.

2. A gasoline tank for airplanes having inner and outer flanges on the end walls thereof, means for riveting said flanges to the shell of the airplane including two rows of rivets, said shell having spaced apertures therein between said rows, and pressure gun nipples riveted on said shell adjacent said apertures whereby gas tight compounds may be forced into the joint.

3. A fuel tank for airplanes having inner and outer flanges on the ends thereof, rivets for securing said flanges to the shell of the airplane, washers having outwardly flaring holes of larger diameter than the rivets for the interior rivet heads at least, a soft metal nipple between each washer and rivet and a liquid tight compound forced into the outside of the joint and between said joint and the shell.

4. A fuel tank for airplanes having end and side walls, inner and outer flanges on the end walls thereof, means for fastening said flanges to the said side walls, said side walls having spaced apertures therein, and pressure gun nipples fastened on said side walls adjacent said apertures whereby fuel tight compounds may be forced into the joint.

5. A thin sheet metal tank for liquids having end and side walls, inner and outer flanges on one of said walls, spaced rows of rivets for securing both flanges to the other wall, said other wall covering the abutting elbows in said flanges and having spaced apertures therein between said rows of rivets, and means at the apertures for receiving a liquid-tight sealing compound under pressure.

6. A thin sheet metal tank for liquids having end and side walls, one of said walls being flanged over, an angle plate riveted around said wall forming with the flanged wall both inner and outer flanges, spaced rows of rivets for securing both flanges to the other wall, spaced plates also secured by some of said rivets adjacent the abutting elbows in said flanges, said plates and the side wall having spaced apertures therein between said rows of rivets, and pressure nipples in the apertures in said plates for receiving a liquid-tight sealing compound.

MICHAEL J. KAPLAN.